(12) United States Patent
Duckwall

(10) Patent No.: US 7,096,302 B2
(45) Date of Patent: *Aug. 22, 2006

(54) METHOD AND APPARATUS FOR ACCELERATING DETECTION OF SERIAL BUS DEVICE SPEED SIGNALS

(75) Inventor: William S. Duckwall, Santa Cruz, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/021,338

(22) Filed: Dec. 21, 2004

(65) Prior Publication Data

US 2005/0114582 A1    May 26, 2005

Related U.S. Application Data

(63) Continuation of application No. 10/214,285, filed on Aug. 5, 2002, now Pat. No. 6,839,791, which is a continuation of application No. 09/441,390, filed on Nov. 16, 1999, now Pat. No. 6,457,086.

(51) Int. Cl.
G06F 13/42    (2006.01)
G06F 3/00    (2006.01)

(52) U.S. Cl. .................... 710/305; 710/11; 710/16; 710/105

(58) Field of Classification Search .................... None
See application file for complete search history.

(56) References Cited

U.S. PATENT DOCUMENTS

| | | | |
|---|---|---|---|
| 4,156,798 A | 5/1979 | Doelz | 179/15 AL |
| 4,194,113 A | 3/1980 | Fulks et al. | 371/20 |
| 5,014,262 A | 5/1991 | Harshavardhana | 370/16 |
| 5,175,855 A | 12/1992 | Putnam et al. | 395/700 |
| 5,274,631 A | 12/1993 | Bhardwaj | 370/60 |
| 5,321,812 A | 6/1994 | Benedict et al. | 395/200 |
| 5,343,461 A | 8/1994 | Barton et al. | 370/13 |
| 5,390,301 A | 2/1995 | Scherf | 395/325 |
| 5,394,106 A | 2/1995 | Black et al. | 327/107 |
| 5,394,486 A | 2/1995 | Eisenbarth et al. | 382/57 |
| 5,394,556 A | 2/1995 | Oprescu | 395/800 |
| 5,406,643 A | 4/1995 | Burke et al. | 395/200 |
| 5,430,486 A | 7/1995 | Fraser et al. | 348/426 |
| 5,452,330 A | 9/1995 | Goldstein | 375/257 |
| 5,490,250 A | 2/1996 | Reschke et al. | 375/185.01 |
| 5,490,253 A | 2/1996 | Laha et al. | 395/304 |
| 5,493,568 A | 2/1996 | Sampat et al. | 370/60 |
| 5,495,481 A | 2/1996 | Duckwall | 370/85.2 |

(Continued)

FOREIGN PATENT DOCUMENTS

EP    1 085 706 A2    3/2001

(Continued)

OTHER PUBLICATIONS

Anderson, Don. "Firewire System Architecture: Second Edition". PC System Architecture Series. Mindshare, Inc., 1999. pp. 117-122 and 312-313.*

(Continued)

*Primary Examiner*—Glenn A. Auve
(74) *Attorney, Agent, or Firm*—Sierra Patent Group, Ltd.

(57) ABSTRACT

A method and apparatus for accelerating detection of speed code signals, and in particular S400 signals, for IEEE Standard 1394-1995 serial bus devices. The present invention validates S400 mode immediately after detecting an S400 speed signal, or immediately after detecting an S400 speed signal following a first S200 speed signal. The invention further provides S200 and S100 mode validation according to current implementations. Additionally, the invention does not require RX_DATA_PREFIX as a prerequisite for signal detection.

5 Claims, 6 Drawing Sheets

U.S. PATENT DOCUMENTS

| | | | |
|---|---|---|---|
| 5,524,254 A | 6/1996 | Morgan et al. | 395/800 |
| 5,539,390 A | 7/1996 | Nagano et al. | 340/825.07 |
| 5,541,670 A | 7/1996 | Hanai | 348/705 |
| 5,559,548 A | 9/1996 | Davis et al. | 348/6 |
| 5,563,886 A | 10/1996 | Kawamura et al. | 370/94.3 |
| 5,568,487 A | 10/1996 | Sitbon et al. | 370/94.1 |
| 5,568,641 A | 10/1996 | Nelson et al. | 395/700 |
| 5,583,922 A | 12/1996 | Davis et al. | 379/96 |
| 5,591,034 A | 1/1997 | Ameen et al. | 439/19 |
| 5,621,659 A | 4/1997 | Matsumoto et al. | 364/514 R |
| 5,630,173 A | 5/1997 | Oprescu | 395/860 |
| 5,632,016 A | 5/1997 | Hoch et al. | 395/200.02 |
| 5,640,595 A | 6/1997 | Baugher et al. | 395/830 |
| 5,642,515 A | 6/1997 | Jones et al. | 395/727 |
| 5,654,657 A | 8/1997 | Pearce | 327/163 |
| 5,684,715 A | 11/1997 | Palmer | 364/514 C |
| 5,701,476 A | 12/1997 | Fenger | 395/652 |
| 5,701,492 A | 12/1997 | Wadsworth et al. | 395/712 |
| 5,706,278 A | 1/1998 | Robillard et al. | 370/222 |
| 5,712,834 A | 1/1998 | Nagano et al. | 369/19 |
| 5,719,862 A | 2/1998 | Lee et al. | 370/355 |
| 5,754,765 A | 5/1998 | Danneels et al. | 395/200.1 |
| 5,764,930 A | 6/1998 | Staats | 395/287 |
| 5,784,648 A | 7/1998 | Duckwall | 395/860 |
| 5,802,048 A | 9/1998 | Duckwall | 370/389 |
| 5,802,057 A | 9/1998 | Duckwall et al. | 370/408 |
| 5,802,365 A | 9/1998 | Kathail et al. | 395/681 |
| 5,805,073 A | 9/1998 | Nagano et al. | 340/825.07 |
| 5,805,822 A | 9/1998 | Long et al. | 395/200.62 |
| 5,809,331 A | 9/1998 | Staats et al. | 395/830 |
| 5,819,115 A | 10/1998 | Hoese et al. | 395/888 |
| 5,826,027 A | 10/1998 | Pedersen et al. | 395/200.51 |
| 5,832,298 A | 11/1998 | Sanchez et al. | 395/828 |
| 5,835,761 A | 11/1998 | Ishii et al. | 395/653 |
| 5,844,619 A | 12/1998 | Songer | 348/447 |
| 5,845,152 A | 12/1998 | Anderson et al. | 395/872 |
| 5,867,730 A | 2/1999 | Leyda | 395/830 |
| 5,875,301 A | 2/1999 | Duckwall et al. | 395/200.51 |
| 5,923,663 A | 7/1999 | Bontemps et al. | 370/445 |
| 5,930,480 A | 7/1999 | Staats | 395/200.74 |
| 5,935,208 A | 8/1999 | Duckwall et al. | 709/221 |
| 5,938,764 A | 8/1999 | Klein | 713/1 |
| 5,940,600 A | 8/1999 | Staats et al. | 395/287 |
| 5,950,066 A | 9/1999 | Hanson et al. | 428/551 |
| 5,954,796 A | 9/1999 | McCarty et al. | 709/222 |
| 5,968,152 A | 10/1999 | Staats | 710/104 |
| 5,970,052 A | 10/1999 | Lo et al. | 370/241 |
| 5,987,605 A | 11/1999 | Hill et al. | 713/2 |
| 5,991,842 A | 11/1999 | Takayama | 710/105 |
| 6,006,275 A | 12/1999 | Picazo, Jr. et al. | 709/249 |
| 6,009,480 A | 12/1999 | Pleso | 710/8 |
| 6,032,202 A | 2/2000 | Lea et al. | 710/8 |
| 6,032,261 A | 2/2000 | Hulyalkar | 713/400 |
| 6,038,234 A | 3/2000 | LaFollette et al. | 370/443 |
| 6,038,625 A | 3/2000 | Ogino et al. | 710/104 |
| 6,041,286 A | 3/2000 | White | 702/176 |
| 6,054,520 A | 4/2000 | Washio et al. | 524/404 |
| 6,070,187 A | 5/2000 | Subramaniam et al. | 709/220 |
| 6,073,206 A | 6/2000 | Piwonka et al. | 711/102 |
| 6,091,726 A | 7/2000 | Crivellari et al. | 370/392 |
| 6,115,764 A | 9/2000 | Chisholm et al. | 710/100 |
| 6,118,486 A | 9/2000 | Reitmeier | 348/441 |
| 6,122,248 A | 9/2000 | Murakoshi et al. | 370/216 |
| 6,131,129 A | 10/2000 | Ludtke et al. | 710/5 |
| 6,131,134 A | 10/2000 | Huang et al. | 710/103 |
| 6,131,163 A | 10/2000 | Wiegel | 713/201 |
| 6,133,938 A | 10/2000 | James | 348/8 |
| 6,138,163 A | 10/2000 | Nam et al. | 709/231 |
| 6,138,196 A | 10/2000 | Takayama et al. | 710/105 |
| 6,141,702 A | 10/2000 | Ludtke et al. | 710/5 |
| 6,141,767 A | 10/2000 | Hu et al. | 714/1 |
| 6,145,018 A | 11/2000 | LaFollette et al. | 710/8 |
| 6,157,972 A | 12/2000 | Newman et al. | 710/100 |
| 6,160,796 A | 12/2000 | Zou | 370/257 |
| 6,167,532 A | 12/2000 | Wisecup | 714/23 |
| 6,173,327 B1 | 1/2001 | De Borst et al. | 709/231 |
| 6,178,445 B1 | 1/2001 | Dawkins et al. | 709/209 |
| 6,185,622 B1 | 2/2001 | Sato | 709/233 |
| 6,188,700 B1 | 2/2001 | Kato et al. | 370/477 |
| 6,192,189 B1 | 2/2001 | Fujinami et al. | 386/96 |
| 6,192,397 B1 | 2/2001 | Thompson | 709/209 |
| 6,199,119 B1 | 3/2001 | Duckwall et al. | 710/8 |
| 6,202,210 B1 | 3/2001 | Ludtke | 725/20 |
| 6,212,171 B1 | 4/2001 | LaFollette et al. | 370/257 |
| 6,212,633 B1 | 4/2001 | Levy et al. | 713/153 |
| 6,219,697 B1 | 4/2001 | Lawande et al. | 709/221 |
| 6,226,680 B1 | 5/2001 | Boucher et al. | 709/230 |
| 6,233,615 B1 | 5/2001 | Van Loo | 709/224 |
| 6,233,624 B1 | 5/2001 | Hyder et al. | 709/237 |
| 6,243,778 B1 | 6/2001 | Fung et al. | 710/113 |
| 6,247,063 B1 | 6/2001 | Ichimi et al. | 709/250 |
| 6,247,083 B1 | 6/2001 | Hake et al. | 710/107 |
| 6,253,114 B1 | 6/2001 | Takihara | 700/83 |
| 6,253,225 B1 | 6/2001 | Hyder et al. | 709/321 |
| 6,256,059 B1 | 7/2001 | Fichtner | 348/207 |
| 6,260,063 B1 | 7/2001 | Ludtke et al. | 709/224 |
| 6,266,334 B1 | 7/2001 | Duckwall | 370/397 |
| 6,266,344 B1 | 7/2001 | Fujimori et al. | 370/468 |
| 6,266,701 B1 | 7/2001 | Sridhar et al. | 709/232 |
| 6,275,889 B1 | 8/2001 | Saito | 710/129 |
| 6,278,838 B1 | 8/2001 | Mendenhall et al. | 386/125 |
| 6,282,597 B1 | 8/2001 | Kawamura | 710/105 |
| 6,292,840 B1 | 9/2001 | Blomfield Brown et al. | 709/247 |
| 6,295,479 B1 | 9/2001 | Shima et al. | 700/83 |
| 6,308,222 B1 | 10/2001 | Krueger et al. | 709/247 |
| 6,311,228 B1 | 10/2001 | Ray | 709/321 |
| 6,314,461 B1 | 11/2001 | Duckwall et al. | 709/221 |
| 6,343,321 B1 | 1/2002 | Patki et al. | 709/227 |
| 6,345,315 B1 | 2/2002 | Mishra | 709/329 |
| 6,347,362 B1 | 2/2002 | Schoinas et al. | 711/147 |
| 6,353,868 B1 | 3/2002 | Takayama et al. | 710/129 |
| 6,356,558 B1 | 3/2002 | Hauck et al. | 370/450 |
| 6,363,085 B1 | 3/2002 | Samuels | 370/502 |
| 6,373,821 B1 | 4/2002 | Staats | 370/252 |
| 6,385,319 B1 * | 5/2002 | Nyu | 380/274 |
| 6,385,679 B1 | 5/2002 | Duckwall et al. | 710/119 |
| 6,405,247 B1 | 6/2002 | Lawande et al. | 709/221 |
| 6,411,628 B1 | 6/2002 | Hauck et al. | 370/447 |
| 6,418,150 B1 | 7/2002 | Staats | 370/503 |
| 6,425,019 B1 | 7/2002 | Tateyama et al. | 710/11 |
| 6,426,062 B1 | 7/2002 | Chopra et al. | 424/65 |
| 6,426,962 B1 | 7/2002 | Cabezas et al. | 370/516 |
| 6,429,902 B1 | 8/2002 | Har Chen et al. | 348/518 |
| 6,442,630 B1 | 8/2002 | Takayama et al. | 710/105 |
| 6,446,116 B1 | 9/2002 | Burridge | 709/214 |
| 6,446,142 B1 | 9/2002 | Shima et al. | 710/16 |
| 6,452,975 B1 | 9/2002 | Hannah | 375/257 |
| 6,457,086 B1 | 9/2002 | Duckwall | 710/305 |
| 6,466,982 B1 | 10/2002 | Ruberg | 709/227 |
| 6,473,561 B1 | 10/2002 | Heo | 386/125 |
| 6,496,862 B1 | 12/2002 | Akatsu et al. | 709/224 |
| 6,502,144 B1 | 12/2002 | Accarie | 710/8 |
| 6,513,085 B1 | 1/2003 | Gugel et al. | 710/305 |
| 6,519,657 B1 | 2/2003 | Stone et al. | 710/10 |
| 6,529,522 B1 | 3/2003 | Ito et al. | 370/466 |
| 6,529,552 B1 | 3/2003 | Ito et al. | 370/466 |
| 6,574,588 B1 | 6/2003 | Shapiro et al. | 703/24 |
| 6,580,591 B1 | 6/2003 | Landy | 361/56 |
| 6,580,694 B1 | 6/2003 | Baker | 370/252 |
| 6,587,904 B1 | 7/2003 | Hauck et al. | 710/107 |
| 6,591,300 B1 | 7/2003 | Yurkovic | 709/226 |
| 6,606,320 B1 | 8/2003 | Nomura et al. | 370/395.1 |
| 6,618,750 B1 | 9/2003 | Staats | 709/209 |

| | | | |
|---|---|---|---|
| 6,618,764 B1 | 9/2003 | Shteyn | 709/249 |
| 6,618,785 B1 | 9/2003 | Whitby-Streves | 710/305 |
| 6,621,832 B1 | 9/2003 | Staats | 370/503 |
| 6,628,607 B1 | 9/2003 | Hauck et al. | 370/216 |
| 6,631,426 B1 | 10/2003 | Staats | 710/9 |
| 6,636,914 B1 | 10/2003 | Teener | 710/240 |
| 6,639,918 B1 | 10/2003 | Hauck et al. | 370/462 |
| 6,643,714 B1 | 11/2003 | Chrysanthakopoulos | 710/8 |
| 6,671,768 B1 | 12/2003 | Brown | 710/102 |
| 6,686,838 B1 | 2/2004 | Rezvani et al. | 340/506 |
| 6,691,096 B1 | 2/2004 | Staats | 707/1 |
| 6,700,895 B1 | 3/2004 | Kroll | 370/412 |
| 6,708,245 B1 * | 3/2004 | Okuda | 710/305 |
| 6,711,574 B1 | 3/2004 | Todd et al. | 707/100 |
| 6,718,497 B1 | 4/2004 | Whitby Strevens | 714/739 |
| 6,745,256 B1 | 6/2004 | Suzuki et al. | 710/18 |
| 6,763,175 B1 | 7/2004 | Trottier et al. | 386/52 |
| 6,766,163 B1 | 7/2004 | Sharma | 455/412.1 |
| 6,813,663 B1 | 11/2004 | Brown | 710/104 |
| 6,831,928 B1 | 12/2004 | Hauck et al. | 370/489 |
| 6,839,791 B1 | 1/2005 | Duckwall | 710/305 |
| 2001/0001151 A1 | 5/2001 | Duckwall et al. | 710/8 |
| 2001/0019561 A1 | 9/2001 | Staats | 370/487 |
| 2001/0024423 A1 | 9/2001 | Duckwall et al. | 370/254 |
| 2002/0101231 A1 | 8/2002 | Staats | 324/126 |
| 2002/0103947 A1 | 8/2002 | Duckwall et al. | 710/19 |
| 2002/0188780 A1 | 12/2002 | Duckwall | 710/105 |
| 2002/0188783 A1 | 12/2002 | Duckwall et al. | 710/119 |
| 2003/0037161 A1 | 2/2003 | Duckwall et al. | 709/233 |
| 2003/0055999 A1 | 3/2003 | Duckwall et al. | 709/236 |
| 2003/0196211 A1 | 10/2003 | Chan | 725/131 |
| 2004/0252231 A1 | 12/2004 | Agnoli et al | 348/435.1 |
| 2004/0252338 A1 | 12/2004 | Agnoli et al. | 725/136 |

FOREIGN PATENT DOCUMENTS

EP          1 085 706 A3     10/2002

OTHER PUBLICATIONS

Bregni et al., "Jitter Testing Technique and Results at VC-4 Desynchronizer Output of SDH Equipment," *IEEE International Conference on Communications*, vol. 3, pp. 1407-1410, May 12, 1994.

"Information Technology-Microprocessor systems—Control and Status Registers (CSR) Architecture for microcomputer buses," ANSI/IEEE Standard 1212, The Institute of Electrical and Electronics Engineers, Inc. pp. I-122, 1994 Edition.

Bregni et al., "Jitter Testing Technique and Results at VC-4 Desynchronizer Output of SDH Equipment," *IEEE Transactions on Instrumentation and Measurement*, vol. 44, Issue 3, pp. 675-678, Jun. 1995.

"IEEE Standard for a High Performance Serial Bus," IEEE Standard 1394-1995, Institute of Electrical and Electronics Engineers, Inc., pp. 1-384, approved Jul. 22, 1996.

Shiwen et al., "Parallel positive justification in SDH C-4 mapping," *IEEE International Conference on Communications*, vol. 3, pp. 1577-1581, Jun. 12, 1997.

"AV/C Digital Interface Command Set General Specification," Rev. 3.0", 1394 Trade Association, pp. 4-5, 20-34, Apr. 15, 1998.

"Enhancements to the AV/C General Specification 3.0 Version 1.0FC1," 1394 Trade Association, pp. 4, 6-17, Nov. 5, 1998.

"Fibre Channel-Methodologies for Jitter Specification," NCITS TR-25-1999, Jitter Working Group Technical Report, Rev. 10, pp. 1-96, Jun. 9, 1999.

"P1394a Draft Standard for a High Performance Serial Bus (Supplement)," Draft 3.0, Institute of Electrical and Electronics Engineers, Inc., pp. 1-187, Jun. 30, 1999.

"IEEE Standard for a High Performance Serial Bus-Amendment 1," Institute of Electrical and Electronics Engineers, Inc., pp. 1-196, approved Mar. 30, 2000.

"P1394b IEEE Draft Standard for a High Performance Serial Bus (High Speed Supplement) P1394b Draft 1.3.3," Institute of Electrical and Electronics Engineers, Inc., pp. 1-408, Nov. 16, 2001.

"1394b IEEE Standard for a High Performance Serial Bus-Amendment 2," Institute of Electrical and Electronics Engineers, Inc. pp. I-xxx, 2002.

* cited by examiner

METHOD AND APPARATUS FOR ACCELERATING DETECTION OF SERIAL BUS DEVICE SPEED SIGNALS

CROSS REFERENCE TO RELATED APPLICATIONS

This application is a continuation of U.S. patent application Ser. No. 10/214,285, filed Aug. 5, 2002 now U.S. Pat. No. 6,839,791 which is a continuation application of U.S. patent application Ser. No. 09/441,390, filed Nov. 16, 1999 now U.S. Pat. No. 6,457,086, issued Sep. 24, 2002 which are hereby incorporated by reference as if set forth herein.

BACKGROUND OF THE INVENTION

1. Field of the Invention

This invention pertains generally to speed signal detection in serial bus device communication. More particularly, the invention is a method and apparatus for accelerating detection of speed code signals, and in particular S400 signals in IEEE Standard 1394-1995, to thereby reduce the bottleneck through physical layer services of a serial bus device.

2. The Prior Art

The Institute of Electrical and Electronics Engineers, Inc. (IEEE) defines the IEEE Standard 1394-1995 serial bus architecture in the document "IEEE Standard for a High Performance Serial Bus" published Aug. 30, 1996, which is incorporated herein by reference. In IEEE 1394, the serial bus architecture is defined in terms of nodes. In general, a node is an addressable entity (i.e., a logical entity with a unique address), which can be independently reset and identified.

The IEEE Standard 1394-1995 further describes a set of three stacked layers comprising a transaction layer, a link layer (LINK), and a physical layer (PHY). Interoperability between the serial bus nodes begins with the physical connection, typically through cables, connectors, and PHY silicon.

The PHY has three primary functions: transmission and receptions of data bits, arbitration, and provision for the electrical and mechanical interface. Transmission of data bits is carried out using the transmission format 1 depicted in FIG. 1. The transmission format 1 includes a data prefix 2 and a data packet 3.

For every data packet 3 that is transmitted, the data packet 3 is preceded by a data prefix 2. The data packet 3 may vary in size according to the data transmitted. For example, the data packet may be 8 kilobits (Kb) at S100 speeds (or 32 Kb at S400 speeds).

The data prefix 2 communicates, among other things, a speed code signal to indicate the data rate of transmission. The cable environment supports multiple data rates of 98.304 megabits per second (Mb/s) or S100, 196.608 Mb/s or S200, and 393.216 Mb/s or S400. The lowest speed (S100) is known as the "base rate." If a higher rate is supported then all lower rates also required.

Speed signaling (also known as common mode signaling) is carried out by indicating an analog signal, and in particular, a common voltage drop ($V_{cm}$) across the Twisted Pair B (TPB) interface of the cable media as is known in the art. As noted above, this speed code signal is communicated during the data prefix 2 portion of the data transmission 1. In general, the speed code signal communicated during the data prefix 2 must be completed 40 nanoseconds (ns) before the data packet 3 portion.

FIG. 2a and FIG. 2b illustrate generally speed code signals communicated by the PHY devices as described above. FIG. 2a illustrates an S200 speed code signal 4 to indicate the S200 data rate. FIG. 2b illustrates an S400 speed code signal 5 to indicate the S400 data rate. The base rate (S100) is indicated by a lack or absence of a speed signal code signal during the data prefix 2.

The S200 speed code signal 4 and the S400 speed code signal 5 are generally 100 ns in length. However, the S200 speed code signal 4 indicates a $V_{cm}$ drop of about 140 millivolts (mV). In contrast, the S400 speed code signal 5 indicates a $V_{cm}$ drop of about 450 mV. The details of implementing speed signal reception was largely left to the designer of a PHY to provide the necessary filtering algorithm that ascertains the various speed code signals communicated by the other PHY devices on the serial bus.

Referring now to FIG. 3 there is generally shown a "driver blast" signal 6 which may sometimes be indicated during the data prefix portion 2 of the data transmission 1. This driver blast signal 6 may sometimes arise when the output of differential port drivers are not activated simultaneously, thereby creating a $V_{cm}$ drop of about 140 mV generally lasting no more than 10 ns.

The problem created by the driver blast signal 6 is that the $V_{cm}$ drop of the driver blast signal 6 appears like and has a similar slope and amplitude to the $V_{cm}$, drop of an S200 speed code signal 4. The difference between the two signals is the length of the signal, the S200 speed code signal 4 lasting about 100 ns while the driver blast signal 6 generally lasting no longer than 10 ns. To distinguish between the driver blast signal 6 and the speed code signals 4, 5, and to avoid misinterpreting the driver blast signal 6 for a speed code signal, a proposed speed filter algorithm has been provided in Table 8–21 of the P1394a Draft 4.0 (most recent), published by the IEEE in Sep. 15, 1999 and is incorporated herein by reference. Many current PHY devices implement this speed filter algorithm.

This proposed speed filter algorithm is represented in flow chart form in FIG. 4. In general, signals are sampled at 20 ns intervals. According to the algorithm, if two consecutive S200 signals (i.e., $V_{cm}$ drop level to that of an S200 speed code signal) are observed then S200 mode is determined to be valid. Similarly, if two consecutive S400 signals are observed, then S400 mode is determined to be valid. Otherwise S 100 mode is the default mode. By requiring two consecutive signals, both of S200 or both of S400, the driver blast signal 6 can be filtered out because two consecutive samples requires the necessary $V_{cm}$ signal for a 20 ns period minimum, whereas the $V_{cm}$ produced by the driver blast signal 6 generally lasts no more than 10 ns.

As shown in FIG. 4, it is common to first detect the S200 signal 4 before detecting the S400 signal 5, primarily due to the slope of the S400 signal. This is because the leading edge of an S400 speed signal is a somewhat leisurely drop to S400 levels; it spends considerable time transitioning through S200 range. In general, the total propagation delay (bottleneck) of a signal through a PHY device is generally 130 to 140 ns, a portion of which is dedicated to sampling speed codes. For detection of S400 speed signals for example, the prior art algorithm described above may not determine the validity of an S400 speed signal until as late as 60 ns (20 ns for sampling the S200 signal, plus 40 ns for sampling two consecutive S400 signals). It is noted that for detection of S200 speed signals, the prior art algorithm described above consumes about 40 ns (two consecutive samples at 20 ns each) for sampling signal. Thus, the propagation delay for detecting S400 signals will generally be greater than the propagation delay for detecting S200 signal.

It is observed that the $V_{cm}$ drop level produced by the driver blast 6 does not reach the $V_{cm}$ drop level produced by an S400 speed code signal 5. Thus, for S400 speed code signaling, filtering for driver blast 6 is not generally required. The prior art algorithm which samples and filters for two consecutive S400 signals thus increases the propagation delay through a PHY device, increasing the overall propagation delay of an S400 transmission on the serial bus as noted above.

Additionally, according to the prior art algorithm, the port must already be receiving RX_DATA_PREFIX. Thus portRspeed cannot go valid (a speed mode cannot be validated) until one clock after portR—typically a 20 ns delay.

Accordingly, there is a need for a method and apparatus for accelerating detection of speed code signals to thereby reduce the bottleneck through a PHY device due to speed signal sampling. The present invention satisfies these needs, as well as others, and generally overcomes the deficiencies found in the background art.

An object of the invention is to provide a method and apparatus for accelerating detection of speed code signals that overcome the deficiencies of the prior art.

Another object of the invention is to provide a method and apparatus for accelerating detection of speed code signals that reduce the propagation through a PHY device.

Another object of the invention is accelerating detection of S400 speed code signals.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method and apparatus embodied in physical 5 layer services suitable for use with serial bus devices, such as IEEE standard 1394-1995 serial bus devices. The invention further relates to machine readable media on which are stored embodiments of the present invention. It is contemplated that any media suitable for retrieving instructions is within the scope of the present invention. By way of example, such media may take the form of magnetic, optical, or semiconductor media. More particularly, a first embodiment of the present invention comprises speed code algorithm code in the form of HDL (Hardware Description Language) code. Another embodiment of the present invention comprises silicon devices (e.g., state machine logic) carrying out the functions described herein with respect to the speed code algorithm.

In its most general terms, the algorithm of the present invention comprises validating S400 mode immediately after detecting an S400 speed signal level, or after detecting an S400 speed signal level following a first S200 speed signal. The invention further provides S200 andS100 mode validation according to current implementations.

More particularly, the speed code algorithm samples signals to detect speed codes signals which are transmitted in the data prefix portion 2 of the data transmission format 1 as described above in conjunction with FIG. 1. In a 25 preferred embodiment, signals are sampled at 20 ns intervals.

The present invention does not have RX_DATA_PREFIX as a prerequisite for speed signal detection. Instead it relies on clearing speed signal registers at approximate times (e.g., at end of packets, chip resets, end of self-id speed signal trap operations). According to this arrangement, speed signaling is available to the state machine logic earlier thereby reducing PHY propagation delay.

The speed code algorithm ascertains or otherwise detects a first speed code signal of either S200 or S400. In a first case, a first S200 speed code signal is detected as the first speed code signal. The algorithm determines whether the next sampled signal is an S400 speed code signal. If so, the algorithm validates the S400 mode immediately based on the consecutive S200 and S400 signals. If not, the algorithm determines if the sampled signal is a second S200 speed code signal. If so, the algorithm validates S200 mode based on the two consecutive S200 signals. Otherwise, the algorithm does not validate either S200 or S400 mode based on the sampled signals detected.

In a second case, a first S400 speed code signal is detected as the first speed code signal, rather than an S200 speed code. The algorithm validates the 20 S400 mode immediately based on the detection of the S400 signal since there is no other mechanism for producing a common mode excursion ($V_{cm}$ level) in the S400 range, as noted above.

Viewed from one vantage point, comprises detecting a first S200 speed signal immediately after detecting the first S200 speed signal; and validating S400 speed mode immediately after detecting the first S400 speed signal.

Viewed from another vantage point, the method of the present invention comprises detecting a first S400 speed signal as the first speed code signal; and validating S400 speed mode immediately after detecting the first S400 speed signal.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 5:
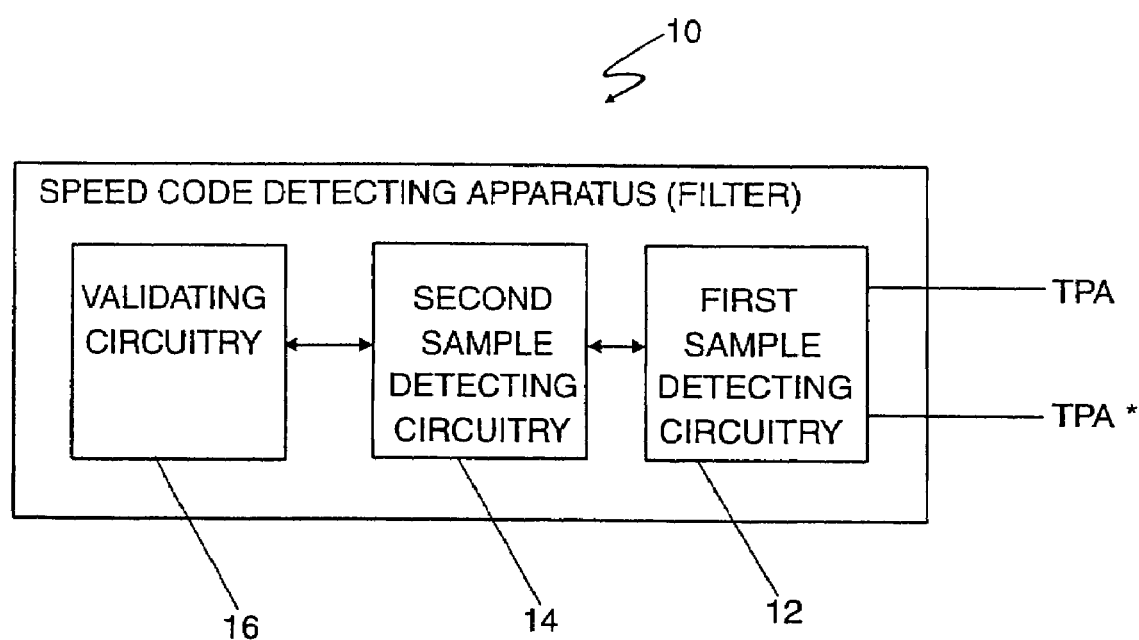
FIG. 5 is a block diagram showing generally the speed signal detecting apparatus of the present invention.
Figure 6:
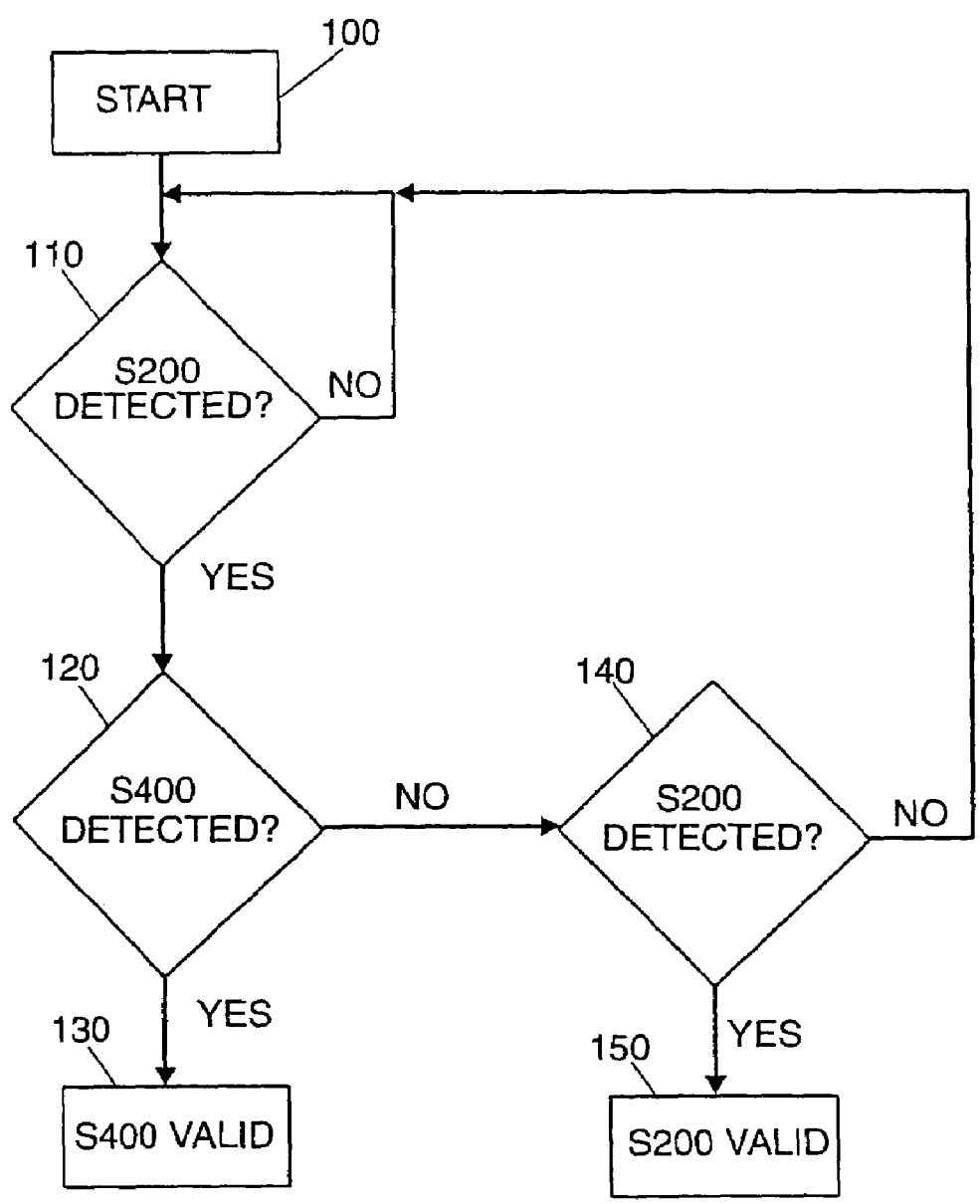
FIG. 6 shows generally a flow chart of the accelerated speed signal detection algorithm of the present invention according to a first case.
Figure 7:
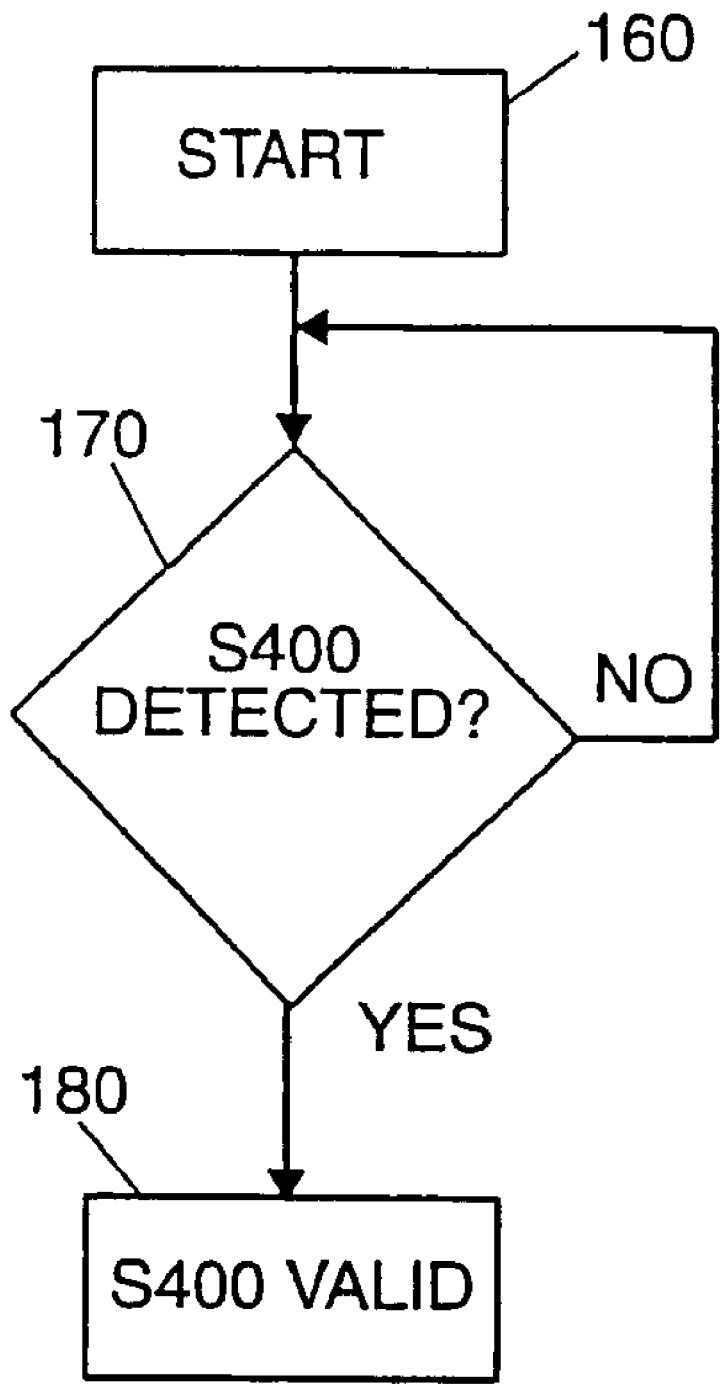
FIG. 7 shows generally a flow chart of the accelerated speed signal detection algorithm of the present invention according to a second case.

Referring more specifically to the drawings, for illustrative purposes the present invention is embodied in the apparatus shown FIG. 5 and the method outlined in FIG. 6 and FIG. 7. It will be appreciated that the apparatus may vary as to configuration and as to details of the parts, and that the method may vary as to details and the order of the acts, without departing from the basic concepts as disclosed herein. The invention is disclosed generally in terms of a method and apparatus for use with IEEE standard 1394-1995 serial bus devices, although numerous other uses for the invention will suggest themselves to persons of ordinary skill in the art.

Figure 1:
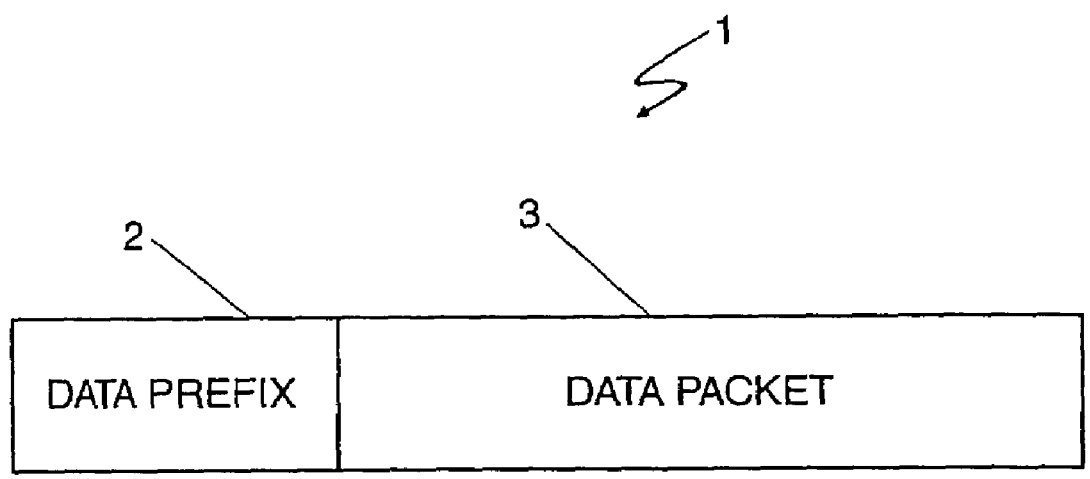
FIG. 1 is a block diagram showing generally a data transmission format used in conjunction with serial bus data transmission and according to the present invention.
Figure 2A:
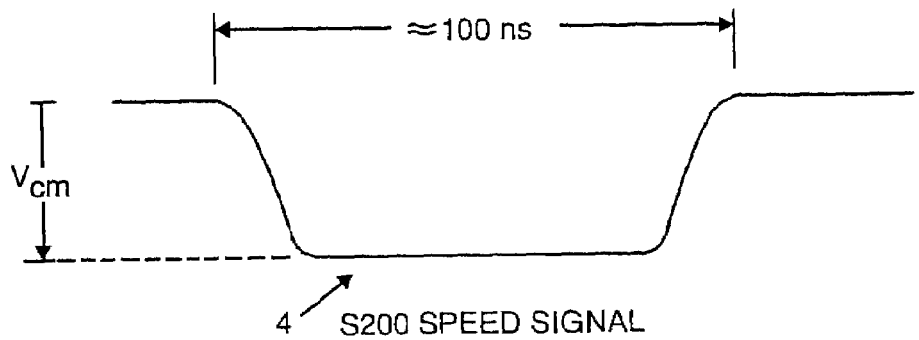
FIG. 2a shows generally an S200 speed code signal.
Figure 2B:
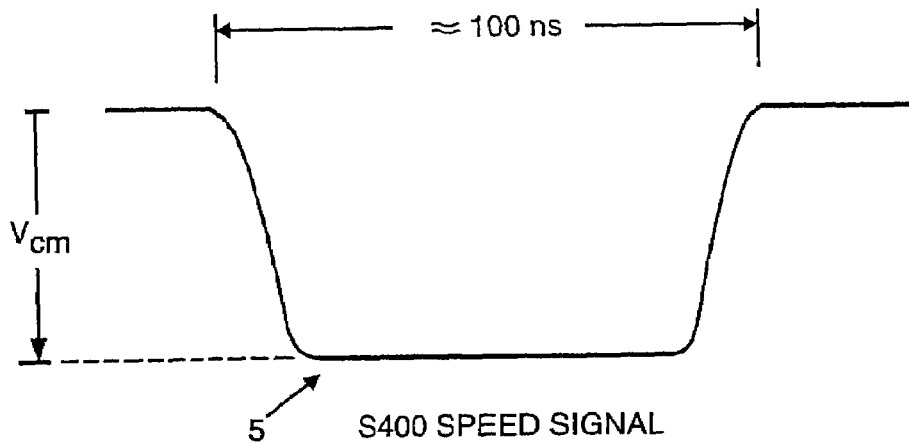
FIG. 2b shows generally an S400 speed code signal.
Figure 3:
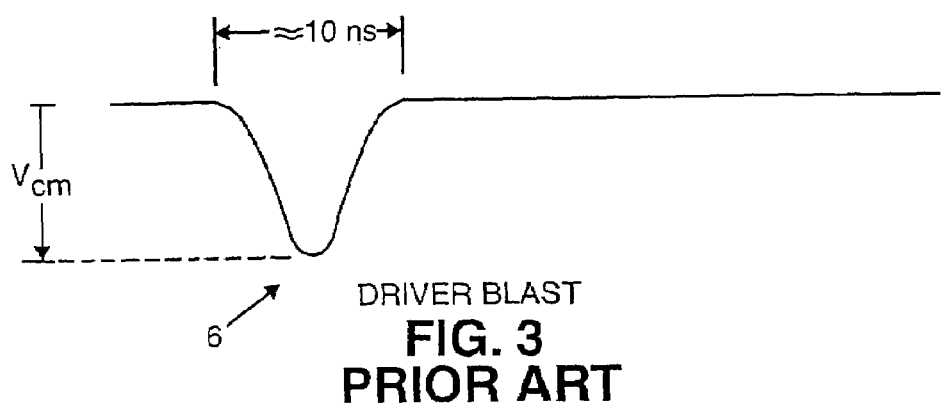
FIG. 3 shows generally a driver blast signal.
Figure 4:
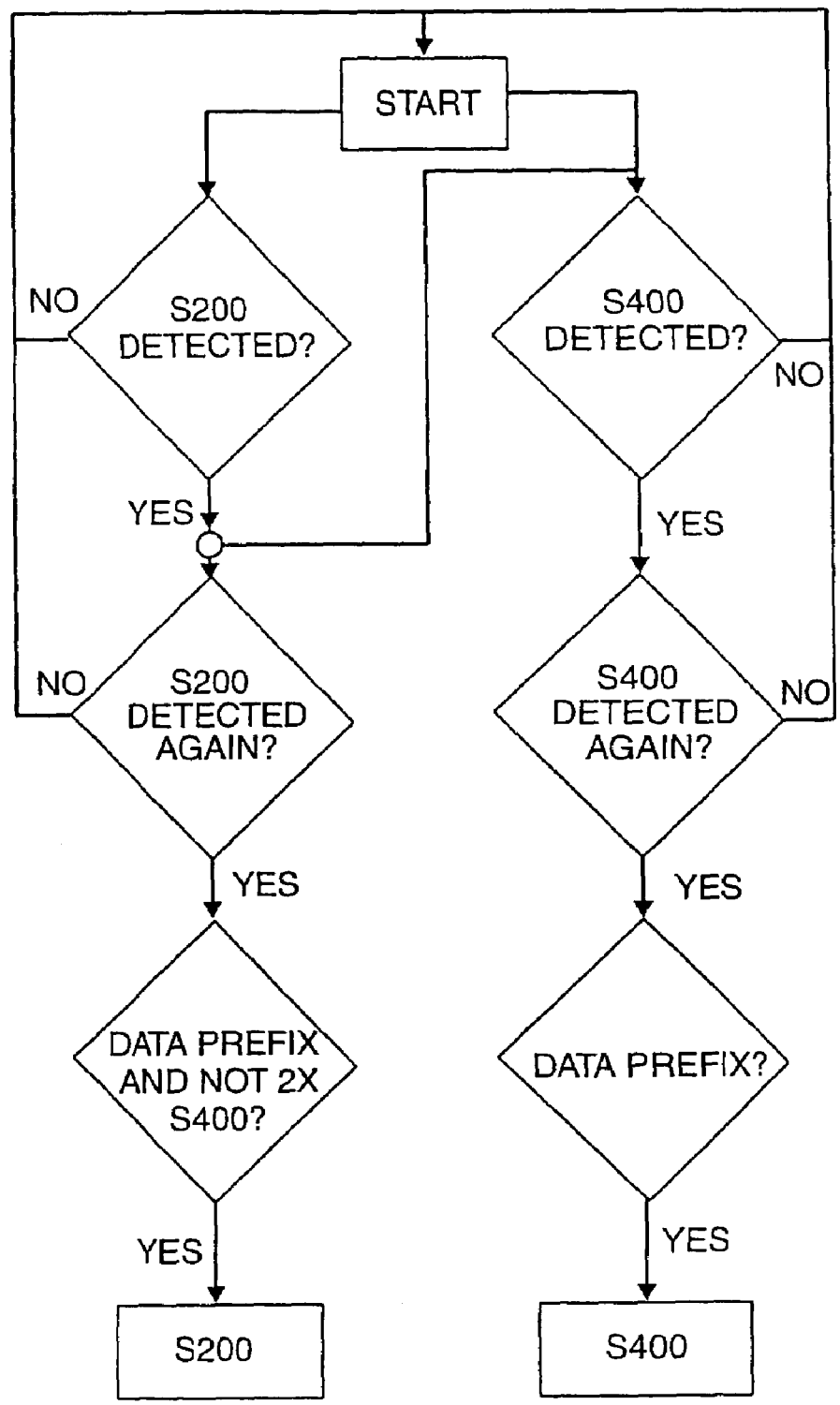
FIG. 4 shows generally a flow chart according to the prior art algorithm for speed signal detection.

Referring now to FIG. 5, as well as FIG. 1 through FIG. 2b, there is generally shown a block diagram of a speed signal detecting apparatus (filter) 10 according to the present invention. Filter 10 includes first sample detecting circuitry 12, second sample detecting circuitry 14, and validating circuitry 16. Sampling circuitry 12,14 sample signals from common mode lines TPA and TPA* at a predefined interval, and in particular, in the preferred embodiment at 20 ns intervals (the speed signal is driven on TPB drivers and are sampled by the TPA receivers). As noted above, circuitry 12, 14, 16 generally comprise state machine logic devices and operates in the PHY of a serial bus node device. In the present example, the serial bus node device is structured and configured according the IEEE Standard 1394-1995.

Filter 10 is further structured such that RX_DATA_PRE-FIX is not a prerequisite for speed signal detection. Instead, filter 10 relies on clearing speed signal registers at appropriate times (e.g., at end of packets, chip resets, end of self-id speed signal trap operations).

First sample detecting circuitry 12 carries out the operation of sampling the signals from TPA/TPA* to detect speed code signals which are communicated in the data prefix portion 2 of the transmission format 1 as described above in conjunction with FIG. 1. More particularly, circuitry 12 is configured to detect S200 and/or S400 speed signals. Circuit 12 continually monitors signals until an S200 or S400 speed signal is detected.

If the first speed signal is detected as S400, then validating circuitry 16 validates S400 mode immediately. However, if the first speed signal is detected as S200, second sample detecting circuitry 14 carries out the operation of sampling the next immediate signal from TPA/TPA* to detect if a second speed signals is observed. If circuit 14 detects an S400 speed signal in the second sampled signal, then validating circuitry 16 validates S400 mode. Circuit 14 also validates S200 mode where two consecutive S200 speed signals are detected (the first S200 signal detected by circuit 12, and the second detected by circuit 14). It noted that filter 10 is thus structured and configured to validate S400 mode after the detection of an S400 signal that immediately follows an S200 speed signal. Additionally, filter 10 is structured and configured to validate S400 mode after the detection of a first S400 speed signal, where the first S400 speed signal is the first sampled speed signal. That is, there may be a situation where the first sampled speed signal as detected by circuit 12 is detected as S400. In this case, the detection of an S400 speed signal is not preceded by a detection of an S200 signal.

As is known in the art, once a speed mode (S100, S200 or S400) is validated, the PHY configures its receiver circuitry to receive data in data packet 3 according to data rate of the speed mode indicated.

The method and operation of the invention will be more fully understood by reference to the flow charts of FIG. 6 and FIG. 7, as well as FIG. 1 through FIG. 2b, and FIG. 5. FIG. 6 illustrates generally the actions associated with detecting speed code signals according to the present invention in a first case scenario. FIG. 7 illustrates generally the actions associated with detecting speed code signals according to the present invention in a second case scenario. The order of operation as shown in FIG. 6 and FIG. 7 and described below is only exemplary, and should not be considered limiting.

It is noted that FIG. 6 as described herein depicts the case where the first sampled speed signal is detected as an S200 signal, while FIG. 7 as described further below depicts the case where the first sampled speed signal is detected as an S400 signal. While the algorithm is depicted herein as two separate flow charts for clarity, the speed detection algorithm may also be depicted as a single flow chart as is known in the art.

Referring now to FIG. 6, at box 100, filter 10 begins speed signal detection. In particular, circuit 12 monitors lines TPA/TPA* to detect S200 and S400 signals as described above. Diamond 110 is then carried out.

At diamond 110, circuit 12 determines whether an S200 speed code signal has been detected. As described above, it is common to first detect an S200 speed code signal before detecting an S400 speed code signal due to the shape and slope of an S400 speed code signal. If an S200 speed code signal is detected, diamond 120 is then carried out. Otherwise, diamond 110 is repeated to monitor the next sampled signal for a speed code signal.

At diamond 120, circuit 14 samples the next immediate signal to determine whether an S400 speed codes signal has been detected. If an S400 speed code signal is detected, box 130 is carried out to validate the S400 mode. Otherwise diamond 140 is carried out to determine if S200 mode is detected.

At box 130, the filter 10 has detected an S400 speed code signal immediately following an S200 speed code signal. According to the present algorithm, this is deemed to be a valid S400 mode. Thus circuit 16 validates the S400 mode based on the consecutive S400 speed code signal and S200 speed code signal. The present algorithm does not sample the next signal to ascertain whether another S400 speed code signal follows the presently determined S400 speed code signal, thereby avoiding the bottleneck associated with the prior art algorithm.

At diamond 140, circuit 14 determines whether the second sampled circuit is a S200 speed code signal. If so, box 150 is carried out to validate S200 mode. Otherwise, speed mode has not been determined, and diamond 110 is repeated to monitor the next sampled signal for a speed code signal.

At box 150, two consecutive S200 speed code signals have been detected, and circuit 16 validates S200 mode.

Referring now to FIG. 7, there is generally shown the case where the first sampled speed signal is detected as an S400 signal.

At box 160, filter 10 begins speed signal detection. Box 160 is the same event as box 100 as described above in conjunction with FIG. 6. Thus, circuit 12 monitors lines TPA/TPA* to detect S200 and S400 signals as described above. Diamond 170 is then carried out.

At box 170, circuit 12 determines whether a first S400 speed code signal has been detected as the first sampled speed code signal. As described above, there may be cases where circuit 12 detects the first sampled speed code signal as an S400 speed code signal, rather than an S200 speed code signal. If an S400 speed code signal is detected, box 180 is carried out to validate the S400 mode. Otherwise, diamond 170 is repeated to monitor the next sampled signal for a speed code signal.

At box 180, the filter 10 has detected an S400 speed code signal. According to the present algorithm, this is deemed to be a valid S400 mode since there is no other mechanism to produce a common mode excursion is the S400 range. Thus circuit 16 validates the S4000 mode based on the single S400 speed code signal.

Accordingly, it will be seen that this invention provides a method and apparatus that accelerates speed code signal detection for serial bus devices. Although the description above contains many specificities, these should not be construed as limiting the scope of the invention but as merely providing an illustration of the presently preferred embodiment of the invention. Thus the scope of this invention should be determined by the appended claims and their legal equivalents.

The invention claimed is:

1. A computer-readable medium containing instructions which, when executed by a computer, administer a serial bus, by receiving a first speed signal by a speed signal register, the first speed signal indicating a first speed code;

receiving a second speed signal by the speed signal register, the second speed signal indicating a second speed code; and validating a speed mode based on the order in which the speed signals were received.

2. The computer readable medium of claim 1, wherein the first speed signal is a S200 signal and the second speed signal is an S400 signal, and the speed mode validated is an S400 speed mode.

3. The computer-readable medium of claim 1, further comprising instructions that execute to clear the speed signal register after transmission of a plurality of packets has concluded.

4. The computer-readable medium of claim 1, further comprising instructions that execute to clear the speed signal register after a chip reset has occurred.

5. The computer-readable medium of claim 1, further comprising instructions that execute to clear the speed signal register after a self-ID speed signal trap has occurred.

* * * * *